(12) United States Patent
Beaumont-Smith et al.

(10) Patent No.: US 8,255,671 B2
(45) Date of Patent: Aug. 28, 2012

(54) PROCESSOR EMPLOYING SPLIT SCHEDULER IN WHICH NEAR, LOW LATENCY OPERATION DEPENDENCIES ARE TRACKED SEPARATE FROM OTHER OPERATION DEPENDENCIES

(75) Inventors: Andrew J. Beaumont-Smith, Cambridge, MA (US); Honkai Tam, Redwood City, CA (US); Daniel C. Murray, Morgan Hill, CA (US); John H. Mylius, Framingham, MA (US); Peter J. Bannon, Concord, MA (US); Pradeep Kanapathipillai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 922 days.

(21) Appl. No.: 12/338,769

(22) Filed: Dec. 18, 2008

(65) Prior Publication Data

US 2010/0162262 A1   Jun. 24, 2010

(51) Int. Cl.
*G06F 9/30* (2006.01)

(52) U.S. Cl. ........................................ 712/217

(58) Field of Classification Search ............... None
See application file for complete search history.

(56) References Cited

U.S. PATENT DOCUMENTS

| | | | | |
|---|---|---|---|---|
| 5,802,386 | A * | 9/1998 | Kahle et al. | 712/23 |
| 5,961,630 | A * | 10/1999 | Zaidi et al. | 712/200 |
| 6,304,955 | B1 * | 10/2001 | Arora | 712/217 |
| 6,308,259 | B1 | 10/2001 | Witt | |
| 6,662,293 | B1 * | 12/2003 | Larson et al. | 712/216 |
| 7,003,648 | B2 | 2/2006 | Chrysos et al. | |
| 2003/0172253 | A1 * | 9/2003 | Balakrishnan et al. | 712/217 |
| 2010/0064121 | A1 * | 3/2010 | Alexander et al. | 712/215 |

* cited by examiner

*Primary Examiner* — Keith Vicary

(74) *Attorney, Agent, or Firm* — Lawrence J. Merkel; Meyertons, Hood, Kivlin, Kowert & Goetzel, P.C.

(57) ABSTRACT

In an embodiment, a scheduler implements a first dependency array that tracks dependencies on instruction operations (ops) within a distance N of a given op and which are short execution latency ops. Other dependencies are tracked in a second dependency array. The first dependency array may evaluate quickly, to support back-to-back issuance of short execution latency ops and their dependent ops. The second array may evaluate more slowly than the first dependency array.

17 Claims, 4 Drawing Sheets

PROCESSOR EMPLOYING SPLIT SCHEDULER IN WHICH NEAR, LOW LATENCY OPERATION DEPENDENCIES ARE TRACKED SEPARATE FROM OTHER OPERATION DEPENDENCIES

BACKGROUND

1. Field of the Invention

This invention is related to the field of processors and, more particularly, to tracking dependencies for instructions and scheduling instructions for execution in a processor.

2. Description of the Related Art

Processors frequently implement out-of-order execution to improve instruction execution performance. In order to obtain additional performance benefits, it is desirable to have a large "scheduling window." The scheduling window is the window of instructions in the instruction stream being executed from which the processor can schedule instructions for execution. Typically, the size of the scheduling window is determined by the amount of buffering implemented by the processor for fetched instructions awaiting execution in the processor. Instructions which are not dependent on one another can execute in any order as a general rule, although some instruction sets do implement ordering rules with respect to some instructions (e.g. memory reference instructions such as loads and stores, synchronizing instructions, etc.). Accordingly, the larger the scheduling window, the more likely the processor will find instructions which can be executed at any given point in time. However, the larger the scheduling window, the longer the scheduling process takes.

A scheduling mechanism typically includes tracking dependencies between instructions, determining instructions that are available to execute (i.e. the instructions which have their dependencies satisfied), and scheduling instructions for execution from the instructions that are available to execute. Once instructions are scheduled, based on the execution latency of the scheduled instructions, dependent instructions on the scheduled instructions become available to schedule. Generally, a instruction is dependent on another instruction if that instruction uses the result of the other instruction as a source operand. In some cases, an instruction may be dependent on another instruction if the other instruction is required to execute first, even if the instruction does not use the result of the other instruction as a source operand.

For short execution latency instructions (e.g. many integer instructions, in most processor instruction set architectures (ISAs)), the delay from scheduling a given instruction to determining that its dependent instructions are eligible for scheduling and scheduling those instructions is critical to performance. That is, the result of the short execution latency instruction is available quickly, and thus the delay in scheduling dependent instructions may unnecessarily delay the execution of the dependent instructions. In the case that no other instructions in the scheduling window are schedulable during the delay, performance is lost.

SUMMARY

In one embodiment, a processor comprises a mapper coupled to a scheduler. The mapper is coupled to receive a decoded instruction operation and configured to generate a first dependency indication and a second dependency indication for the decoded instruction operation responsive to prior instruction operations in the processor on which the decoded instruction operation depends. The first dependency indication indicates dependencies on prior instruction operations that are within N instruction operations of the decoded instruction operation in program order. The second dependency vector indicates dependencies on up to M instruction operations, wherein N is an integer greater than or equal to one and less than M, and M is a number of instruction operations concurrently storable in a scheduler. The scheduler is configured to schedule the decoded instruction operation for execution responsive to evaluating the first dependency vector and the second dependency vector and determining that the dependencies of the decoded instructions have been satisfied.

In an embodiment, a scheduler comprises a first dependency array, a second dependency array, and a control unit. The first dependency array is configured to store a first plurality of dependency indications corresponding to a plurality of instruction operations concurrently storable in the scheduler. A first dependency indication identifies dependencies for a first instruction operation on prior instruction operations, the prior instruction operations within N instruction operations of the first instruction operation in program order. N is an integer greater than or equal to one and less than a number of the plurality of instruction operations, and the prior instruction operations having an execution latency less than or equal to a specified latency. The second dependency array is configured to store a second plurality of dependency indications corresponding to the plurality of instruction operations. A second dependency indication identifies dependencies for the first instruction operation that are not identified in the first dependency indication. Coupled to the first dependency array and the second dependency array, the control unit is configured to schedule the first instruction operation for execution responsive to detecting that the dependencies of the first instruction operation indicated by the first dependency indication and the second dependency indication have been satisfied.

In another embodiment, a scheduler comprises a first dependency array configured to store a first plurality of dependency indications corresponding to a plurality of instruction operations storable in the scheduler; a second dependency array configured to store a second plurality of dependency indications corresponding to the plurality of instruction operations; and a control unit coupled to the first dependency array and the second dependency array. The control unit is configured to identify one or more instruction operations being scheduled for execution. The first dependency array and the second dependency array are configured to evaluate which instruction operations have satisfied dependencies in the respective first plurality of dependency indications and the second plurality of dependency indications and to indicate the instruction operations as eligible for scheduling to the control unit. The first dependency array is configured to evaluate in less time than the second dependency array.

In an embodiment, a mapper comprises a rename map and a dependency vector generation unit coupled to the rename map. The rename map is configured to store, for each logical register in a processor, an identifier of a most recent update to the logical register and an execution latency indication indicating an execution latency of the instruction operation that performs the most recent update. The rename map is coupled to receive one or more source operand identifiers of a first instruction operation and to output corresponding identifiers and execution latency indications. The dependency generation unit is configured to generate a first dependency indication and a second dependency indication for the first instruction operation responsive to the identifier and the execution latency corresponding to each source operand identifier. A size of the first dependency indication and the second dependency indication are different.

In an embodiment, a method comprises receiving a first instruction operation; generating a first dependency indication responsive to prior instruction operations in the processor on which the instruction operation depends, wherein the first dependency indication indicates dependencies on prior instruction operation that are within N instruction operations of the first instruction operation in program order; generating a second dependency indication for the first instruction operation, wherein the second dependency vector indicates dependencies on up to M instruction operations, wherein N is an integer greater than or equal to one and less than M, and M is a number of instruction operations concurrently storable in a scheduler; writing the first instruction operation and the first and second instruction operation to the scheduler; evaluating the first and second dependency indications to determine that dependencies of the first instruction operation have been satisfied; and scheduling the first instruction operation for execution responsive to determining that dependencies of the first instruction operand and the second instruction operation have been satisfied.

BRIEF DESCRIPTION OF THE DRAWINGS

The following detailed description makes reference to the accompanying drawings, which are now briefly described.

Figure 1:
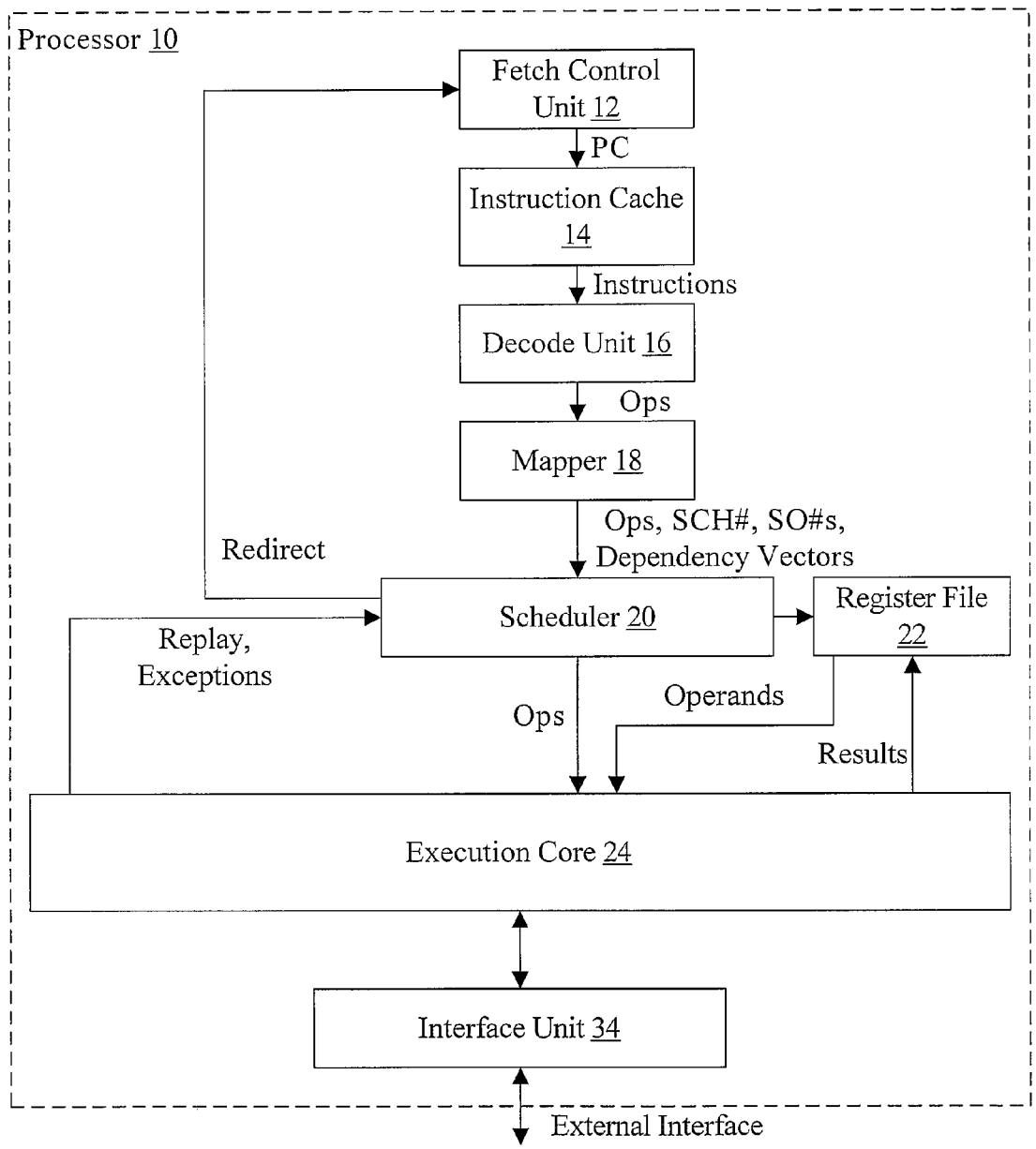
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In one embodiment, a processor implements multiple dependency indications per instruction operation (op). One dependency indication for a given op identifies prior ops on which the given op is dependent and which are within "N" ops of the given op in program order. This dependency indication is referred to herein as the "near" dependency indication. N is an integer greater than or equal to one and less than a number "M" of ops that can concurrently be stored in the scheduler of the processor (where M is also an integer). That is, M is the maximum number of ops that can be included in the scheduling window of the processor.

Another dependency indication may identify any prior op in the scheduling window on which the given op depends and that is not identified by the near dependency indication. This dependency indication is referred to as the "remaining" dependency indication, since it identifies dependencies not identified by the near dependency indication. Thus, a given dependency may be recorded in only one of the near dependency indication and the remaining dependency indication, in this embodiment.

More particularly, the near dependency indication may identify ops within N ops of the given op in program order and which have short execution latencies (e.g. execution latencies less than or equal to a specified latency). In one embodiment, a short execution latency op may have an execution latency of one clock cycle. In general, in other embodiments, a short execution latency op may be any op having an execution latency that is less than the scheduling latency of the scheduler. The scheduling latency may be the amount of time that elapses from the scheduling of an op, through evaluating dependencies in the full scheduler window (e.g. over the remaining dependency indications as well as the near dependency indications) and identifying eligible ops, to possibly scheduling a dependent op that has its dependencies satisfied. Accordingly, performance of the processor may be impacted by the scheduling latency being greater than the execution latency of the short execution latency ops. Ops that are within N ops of the given op but which have execution latencies longer than the specified latency (e.g. 2 or more clock cycles, in one embodiment) are recorded in the remaining dependency indication, in some embodiments. Since the execution latency of these ops is longer than the scheduling latency, the scheduling latency may not impact performance for the longer execution latency ops.

The scheduler may be configured to evaluate the near dependency indications and the remaining dependency indications separately, and may complete the evaluation and identification of eligible ops in the near dependency indication within the short execution latency. If the dependency of a subsequent op on a short execution latency op is the last of the dependencies to be satisfied for the subsequent op, that subsequent op may be scheduled in less time than the scheduling latency. More specifically, the subsequent op may be scheduled "back to back" with the short execution latency op, and thus performance of the processor may be improved.

The dependency indications may be any values that may uniquely identify dependencies of the given op on previous ops. For example, in one embodiment, each dependency indication may be a dependency vector having a bit location assigned to each prior op. If the bit is set, a dependency is indicated and if the bit is clear, a dependency is not indicated (or vice versa). The near dependency vector may thus have N bits, corresponding to the N immediately prior ops to the given op in program order. The remaining dependency vector may include M bits, each assigned to a different entry in the scheduler. Dependency vectors will be used as an example in the description below, but may generally be any indication in other embodiments. For example, the dependency indications may be lists of op identifiers (e.g. scheduler numbers in the discussion below) identifying the ops on which the given op is dependent.

In various implementations, N may vary. N may depend on the characteristics of code to be executed by the processor. For example, the characteristics of code in benchmark programs used to determine the performance of a processor may be used. N may be a relatively small number compared to the M ops that may be concurrently stored in the scheduler. For example, N may be at least an order of magnitude less than M.

In one embodiment, N has been determined to be 4 by the inventors, by analyzing code sequences. In this instance, if the near dependency vector tracks dependencies for the nearest 4 instructions, a large percentage of the performance gain for early scheduling of the dependent ops may be achieved. For other instruction set architectures and/or code sequences of interest, N may be greater than or less than 4. Furthermore, as compiler technology continues to evolve, N may vary even for the same instruction set. On the other hand, a scheduling window (M) of, e.g. 48, 64, or even more ops may be implemented, in one embodiment. Other embodiments may implement fewer ops in the scheduling window as well.

In some embodiments, a larger scheduling window may be implemented (increasing the scheduling latency above the short execution latency) while still retaining the performance advantages of back to back scheduling of dependent ops, even for the short execution latency ops. Furthermore, the performance advantages of the larger scheduling window (and thus the ability to schedule more operations out of order in the processor) may be realized in some such embodiments. The execution latency of an op may generally comprise the amount of time elapsing from the point at which the source operands are provided to the execution hardware to execute the op until the time at which the result is available. In general, the scheduling latency and the execution latency may be measured at the granularity of clock cycles of the clock supplied to the processor.

The short execution latency ops may comprise any subset of the instruction set defined by the instruction set architecture implemented by the processor. For example, most integer instructions may be short execution latency ops, in one embodiment. Which ops are short execution latency and which are longer execution latency may vary from embodiment to embodiment, and may depend on the execution hardware implemented in the execution core in the processor.

The present description refers to the program order of ops. Generally, the program order of ops may be the order of the corresponding instructions as listed in the code sequence being executed. At any given point in time, the program order may be partially or fully speculative (e.g. if predicted branch instructions or instructions that may cause an exception are in the order). The speculative program order is the program order for dependency purposes at that point in time. Additionally, dependencies of an op are referred to herein as being satisfied in response to the corresponding prior op being scheduled. The dependency may be satisfied immediately on scheduling of the prior op (e.g. for a short execution latency op) or at a delay from scheduling based on the execution latency of the prior op. Generally, a dependency for an op may be considered to be satisfied if the dependency no longer prevents the scheduling of the op (e.g. the source operands will be available to the execution hardware when the op reaches the hardware).

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter (PC) for fetching from the instruction cache 14. The instruction cache 14 is coupled to provide instructions to the decode unit 16, which is coupled to provide decoded instruction operations (ops) to the mapper 18. The mapper 18 is coupled to provide ops, a scheduler number (SCH#), source operand numbers (SO#s), and one or more dependency vectors to the scheduler 20. The scheduler 20 is coupled to receive replay and exception indications from the execution core 24, is coupled to provide a redirect indication to the fetch control unit 12, is coupled to the register file 22, and is coupled to provide ops for execution to the execution core 24. The register file is coupled to provide operands to the execution core 24, and is coupled to receive results to be written to the register file 22 from the execution core 24. The execution core 24 is coupled to the interface unit 34, which is further coupled to an external interface of the processor 10.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.). In the illustrated embodiment, the redirection may be provided by the scheduler 20. In other embodiments, redirection may be provided by the execution core 24, or some redirects may be provided from the execution core 24 while others are provided from the scheduler 20.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the performance of the operations defined for that instruction according to the instruction set architecture. In some embodiments, each instruction may decode into a single instruction operation. The decode unit 16 may identify the type of instruction, source operands, etc., and the decoded instruction operation may comprise the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may assign a scheduler entry to store each op, identified by the SCH#. In one embodiment, the SCH# may also identify the rename register assigned to the destination of the op. In other embodiments, the mapper 18 may assign a separate destination register number. Additionally, the mapper 18 may generate dependency vectors for the op. The dependency vectors may identify the ops on which a given op is dependent. Specifically, as noted above, the dependency vectors for each op may include the near dependency vector and the remaining dependency vector. In one embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 18 may provide the ops, along with SCH#, SO#s, and dependency vectors for each op to the scheduler 20. The scheduler 20 may store the ops in the scheduler entries identified by the respective SCH#s, along with the SO#s. The scheduler may store the dependency vectors in dependency arrays that evaluate which ops are eligible for scheduling. The scheduler 20 may schedule the ops for execution in the execution core 24. When an op is scheduled, the scheduler 20 may read its source operands from the register file 22 and the source operands may be provided to the execution core 24. The execution 24 may return the results of ops that update registers to the register file 22. In some cases, the execution core 24 may forward a result that is to be written to the register file 22 in place of the value read from the register file 22 (e.g. in the case of back to back scheduling of dependent ops).

The register file 22 may generally comprise any set of registers usable to store operands and results of ops executed in the processor 10. In some embodiments, the register file 22 may comprise a set of physical registers and the mapper 18 may map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may comprise an architected register set containing the committed state of the logical registers and a speculative register set containing speculative register state.

The interface unit 34 may generally include the circuitry for interfacing the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

In various embodiments, the processor 10 may implement any instruction set architecture.

Figure 2:
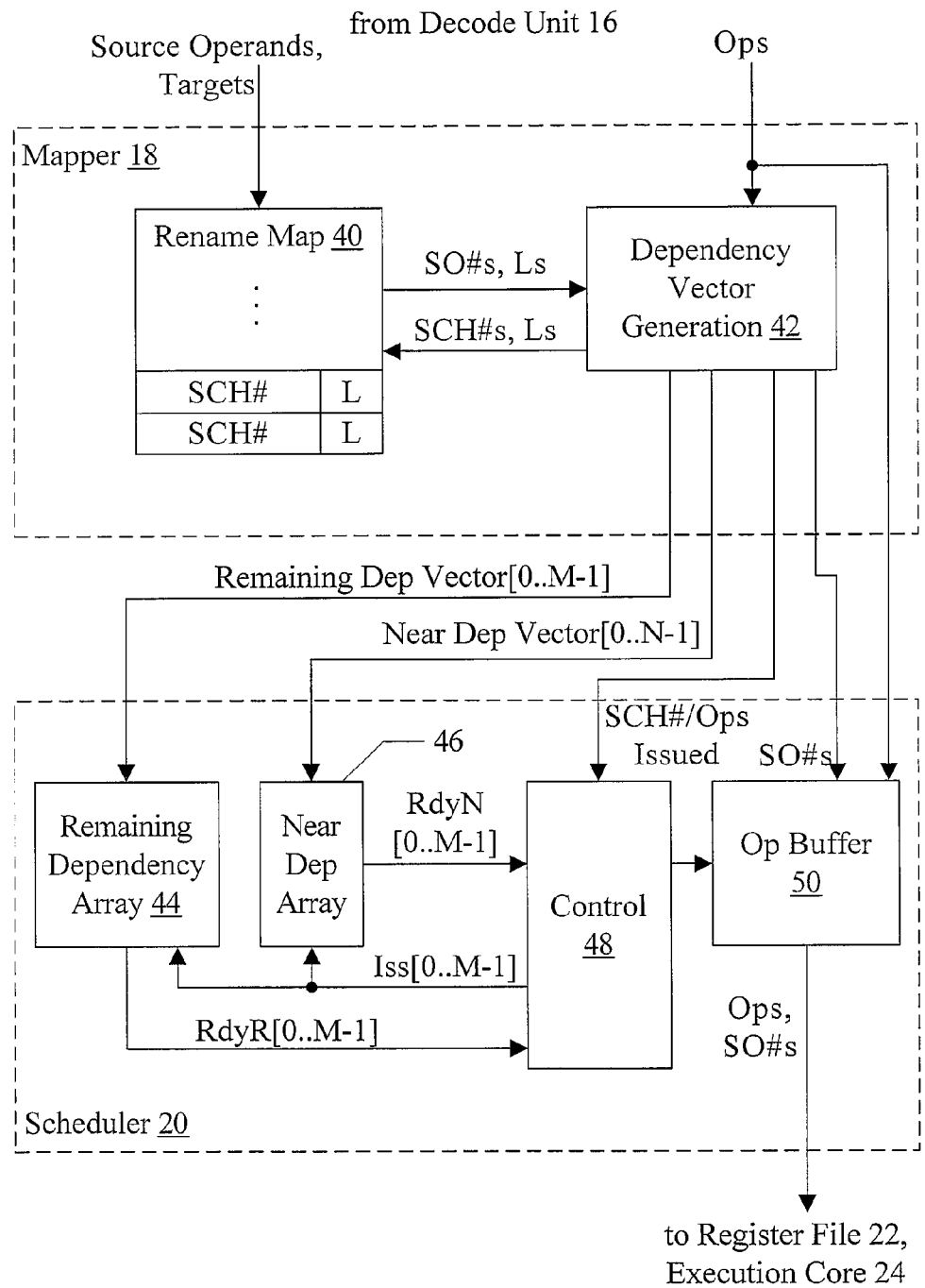
FIG. 2 is a block diagram of one embodiment of a mapper and a scheduler shown in more detail.

Turning next to FIG. 2, a block diagram illustrating one embodiment of a portion of the mapper 18 and a portion of the scheduler 20 in more detail is shown. In the embodiment of FIG. 2, the mapper 18 comprises a rename map 40 coupled to a dependency vector generation unit 42. The scheduler 20 comprises a remaining dependency array 44, a near dependency array 46, a control unit 48, and an op buffer 50. The remaining dependency array 44 and the near dependency array 46 are coupled to the control unit 48, which is further coupled to the op buffer 50. The dependency vector generation unit 42 is coupled to receive the ops from the decode unit 16. The rename map 40 is coupled to receive source operands and targets corresponding to the ops from the decode unit 16. The op buffer 50 is coupled to receive the ops, and SO#s from the dependency vector generation unit 42. The control unit 48 is coupled to receive an SCH# and a number of ops issued from the dependency vector generation unit 42. The near dependency array 46 and the remaining dependency array 48 are coupled to receive respective dependency vectors from the dependency vector generation unit 42. The op buffer 50 is coupled to provide ops and register addresses to the execution core 24 and the register file 22, respectively.

The rename map 40 comprises an entry for each logical register. The entry may store the scheduler number (SCH#) of the most recent op to update the logical register. Additionally, the rename map 40 may store an indication of the execution latency of the most recent op (L). L may be a bit, which may be set to indicate long execution latency and clear to indicate short execution latency, or vice versa. The L bit may indicate which dependency vector should include the dependency, if the most recent op is within N ops of a subsequent dependent op. Additional status may be stored in the rename map entries as well. For example, a bit may indicate whether or not the most recent op has been executed (and thus the dependency may be noted but may also be indicated as satisfied). In such an embodiment, the rename map 40 may receive the signals from the control unit 48 identifying the ops that have been scheduled (described in more detail below) in order to update the bit. A bit indicating whether or not the most recent op has been retired may also be included.

In response to the source operand addresses from the decode unit 16, the rename map 40 may output the corresponding source operand numbers (SO#s) to the dependency vector generation unit 42. That is, the SO#s may be the SCH#s stored in the rename map 40 for the corresponding operand addresses. Accordingly, the SO#s may be used to determine the dependencies on previous ops for the current op (or ops) from the decode unit 16. The SO#s are also register addresses for the register file 22 for the source operands of the ops. In addition to the SO#s, the rename map 40 may provide the execution latency indications (Ls) corresponding to the SO#s to the dependency vector generation unit 42.

The dependency vector generation unit 42 may generate dependency vectors for each op, transmitting the dependency vectors to the scheduler 20. While one dependency vector of each type is illustrated in FIG. 2, multiple dependency vectors may be transmitted to the scheduler concurrently if more than one op can be written to the scheduler concurrently. The dependency vector generation unit 42 may determine the distance between each decoded op and the ops on which it depends from the SO#s and the SCH# being assigned to the decoded op. If the distance is less than or equal to N, and the prior op is a short execution latency op, the dependency vector generation unit 42 may include the dependency in the near dependency vector. If the distance is greater than N, or the prior op is a long execution latency op, the dependency vector generation unit may include the dependency in the remaining dependency vector.

The dependency vector generation unit 42 may also update the rename map 40 with the SCH#s assigned to the decoded ops being processed by the mapper 18. The rename map 40 receives the target register addresses (identifying the logical registers that are the targets of the decode ops) from the decode unit 16, and updates the corresponding entries with the SCH#s provided by the dependency vector generation unit 42. The dependency vector generation unit 42 may also receive the decoded ops (and/or an indication of the execution latency of the ops, if the decode unit 16 determines the latency), and generates the latency indications (Ls) to be written to the rename map 40 as well.

As illustrated in FIG. 2, the near dependency vector comprises N bits (0 to N−1). The N bits correspond to the N immediately preceding ops in program order. Accordingly, the near dependency vector identifies prior ops relative to the op to which the near dependency vector corresponds. The remaining dependency vector comprises M bits (0 to M−1). The remaining dependency vector identifies prior ops based on the scheduler location storing the ops.

The dependency vector generation unit 42 forwards the SO#s for each op to the op buffer 50 (or the SO#s may be received by the op buffer 50 from the rename map 40), and the ops are forwarded from the decode unit 16 to the op buffer 50. Based on the SCH# from the dependency vector generation unit 42, the control unit 48 may cause the assigned storage locations in the op buffer 50 to update with the ops and SO#s. Similarly, the control unit 48 may cause the near dependency array 46 to update with the near dependency vector for each op and the remaining dependency array 44 to update with the remaining dependency vector.

The dependency arrays 44 and 46 may include storage for the respective dependency vectors. Accordingly, each dependency array 44 and 46 may comprise M entries. The entries in the dependency array 44 also comprise M bits each, but the entries in the near dependency array 46 comprise N bits each. The dependency arrays 44 and 46 may also include logic to determine when the dependencies indicated by the respective dependency vectors have been satisfied. When the control unit 48 schedules ops for execution, the control unit 48 transmits an indication of the scheduled ops to the dependency arrays 44 and 46 (Iss[0 . . . M−1] in FIG. 2). In FIG. 2, the indication comprises a signal for each entry in the scheduler, which may be asserted to indicate that the op in the entry has been scheduled. Other embodiments may signal the scheduling in other ways.

Since the near dependency array 46 only indicates dependencies for short execution latency ops, the near dependency array 46 need only note that the dependencies are satisfied for the scheduled ops. As mentioned previously, the near dependency vectors are relative to the entry in the scheduler of the corresponding op. Accordingly, the signals of the N most recent ops may be wired to each corresponding entry. For example, the N most recent ops for the op in entry M−1 are the ops in entries M−N−1 to M−2.

Because the near dependency array 46 is smaller than the remaining dependency array 44, and because the execution latency of the prior op is known to be the short execution latency for the near dependency array 46, the near dependency array may evaluate dependencies rapidly and may signal which ops are eligible for scheduling more quickly than the remaining dependency array 44. The near dependency array 46 may signal which ops are eligible (all dependencies identified in the near dependency array 46 are satisfied) by asserting corresponding ready signals (RdyN[0 . . . M−1]) to the control unit 48.

The remaining dependency array 44 may receive the Iss [0 . . . M−1] signals as well, and may evaluate dependencies in the array. The remaining dependency array 44 may include longer execution latency ops, and thus the evaluation may include noting, in the entry for the scheduled ops, that the scheduling has occurred. When the execution latency of the op has expired, the entry may signal other entries that the dependency for that op has been satisfied, and the ready signals corresponding to the dependent ops may be asserted by the remaining dependency array 44 (RdyR[0 . . . M−1] in FIG. 2). Accordingly, the evaluation time in the remaining dependency array 44 may be longer than the near dependency array 46 due to the more complex evaluation and the additional circuitry involved, in addition to the larger size of the remaining dependency array 44. In other embodiments, the SCH# of a completing op may be transmitted by the execution core 24 when the op is completing (or a few cycles prior to completing, to account for scheduling latency and pipeline delays).

A given op in entry "i" of the scheduler may thus be eligible for scheduling if both the RdyN[i] signal and the RdyR[i] signal are asserted. The control unit 48 may receive both sets of signals (RdyN[0 . . . M−1] and RdyR[0 . . . M−1]) and may identify ops eligible for scheduling (e.g. logically bitwise ANDing the corresponding RdyN and RdyR signals). The control unit 48 may apply a scheduling algorithm to the eligible ops, and may schedule as many ops as possible from the eligible ops based on the capability of the execution core 24 to concurrently handle the ops. The control unit 48 may signal the scheduled ops to the dependency arrays 44 and 46 (Iss[0 . . . M−1]), and may read the schedule ops and SO#s from the op buffer 50 for transmission to the execution core 24 and the register file 22.

In the present embodiment, the processor 10 supports replays and thus the dependency bit in the dependency arrays 44 and 46 may not be cleared in response to the scheduling of a prior op (in case the prior op is later replayed and thus the dependency needs to be reasserted and tracked). An additional bit at each position in the array may indicate whether or not the dependency is satisfied, and the additional bit may be cleared if the prior op is later replayed, in one embodiment.

It is noted that the mapper 18 may further include a second rename map (not shown in FIG. 2) that stores the committed logical register state corresponding to the most recently retired instruction. The second rename map may be used in conjunction with the rename map 40 to recover the correct rename state in response to exceptions, redirects, etc.

Figure 3:
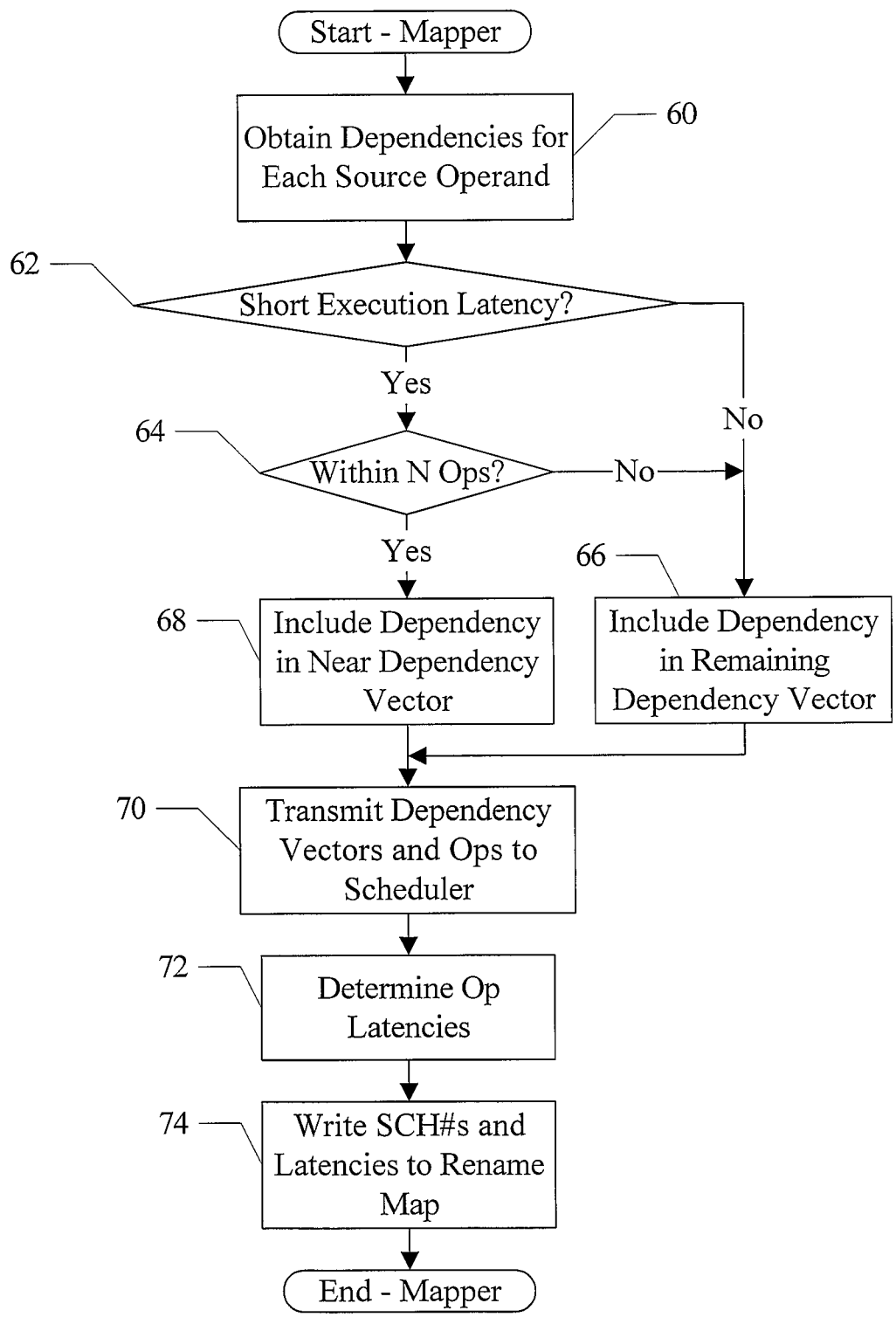
FIG. 3 is a flowchart illustrating operation of one embodiment of the mapper.

Turning next to FIG. 3, a flowchart is shown illustrating operation of one embodiment of the mapper 18 (and more particularly the dependency vector generation unit 42, in the embodiment of FIG. 2). While the blocks are shown in a particular order, other orders may be used. Blocks may be performed in parallel in combinatorial logic in the mapper 18/dependency vector generation unit 42. Blocks, combinations of blocks, and/or the flowchart as a whole may be pipelined over multiple clock cycles.

The mapper 18 may obtain the dependencies for each source operand of the decoded op from the rename map 40 (block 60). The dependencies may include the SO# and the latency (L) indication. For each source operation, if the latency indication does not indicate short execution latency for the prior op (decision block 62, "no" leg) or the prior op is not within a distance of N ops to the decoded op (decision block 64, "no" leg), the mapper 18 may include the dependency in the remaining dependency vector for the decoded op (block 66). For each source operand, if the latency indication indicates short execution latency (decision block 62, "yes" leg) for the prior op and the prior op is within the distance of N ops to the decoded op (decision block 64, "yes" leg), the mapper 18 may include the dependency in the near dependency vector for the decoded op (block 68). The operation of blocks 60, 62, 64, 66, and 68 may be performed in parallel for each operand of a decoded op to generate the near and remaining dependency vectors for that decode op, and in parallel for each decoded op if more than one op is provided to the mapper 18 in a given clock cycle.

The mapper 18 may transmit the decoded ops and dependency vectors to the scheduler 20 for storage (block 70). Additionally, the mapper 18 may determine the execution latency for each decoded op (block 72), and may write the latency indications and SCH#s to the rename map 40 (to the locations address by the target register addresses provided by the decode unit 16) (block 74). Blocks 72 and 74 may be performed in parallel with the remaining blocks of FIG. 3, and in parallel for each decoded op if more than one op is provided concurrently from the decode unit 16.

Figure 4:
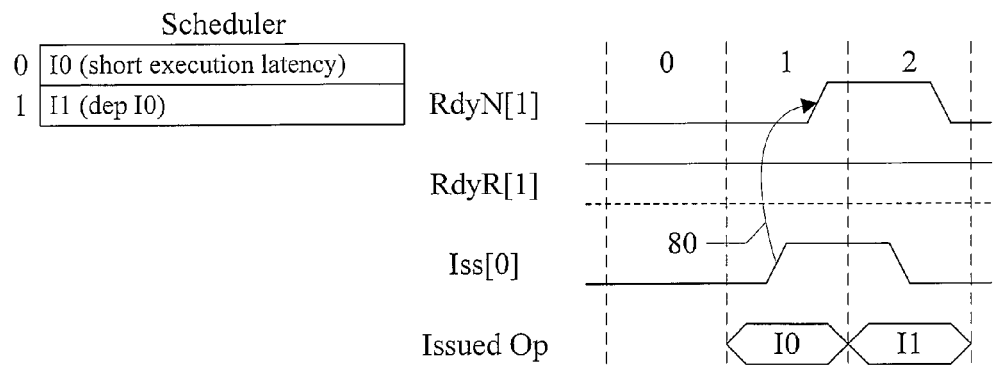
FIG. 4 is a timing diagram illustrating one example of scheduling a dependent instruction operation.

Turning now to FIG. 4, a timing diagram is shown illustrating one example of an op (I0) and another op (I1) dependent on I0. The op I0 is written to scheduler entry 0, and the op I1 is written to the scheduler entry 1. The op I0 is a short execution latency op, and thus the dependency of the op I1 on the op I0 is indicated in the near dependency vector in entry 1 (not shown in FIG. 4). In the timing diagram, consecutive clock cycles 0, 1, and 2 are shown, delimited by vertical dashed lines. The ready signals for the op I1 (RdyN[1] and RdyR[1]) are illustrated in FIG. 4, along with the Iss signal for the op I0 (Iss[0]). The ops issued by the scheduler are also shown in FIG. 4.

In clock cycle 0, the RdyN[1] signal is deasserted because the op I0 has not yet been scheduled and the op I1 is dependent on the op I0 in the near dependency vector. The RdyR[1] signal is asserted, indicating that any dependencies in the remaining dependency vector have been satisfied.

In clock cycle 1, the scheduler 20 schedules the op I0, and thus asserts the Iss[0] signal. The op I0 is also issued from the scheduler 20. Responsive to the Iss[0] signal, the RdyN[1] signal asserts (relationship indicated by arrow 80). The scheduler 20 detects that the op I1 is eligible to be issued, and issues the op I1 in clock cycle 2. Thus, the op I0 and its dependent op I1 have issued in back-to-back clock cycles. It is noted that the op I0 and its dependent op I1 issue back-to-back because other dependencies were already satisfied (i.e. the dependency of the op I1 on the op I0 was the last of the op I1's dependencies to be satisfied). If another dependency of the op I1 was not yet satisfied, the op I1 would not have been scheduled as shown in FIG. 4.

Figure 5:
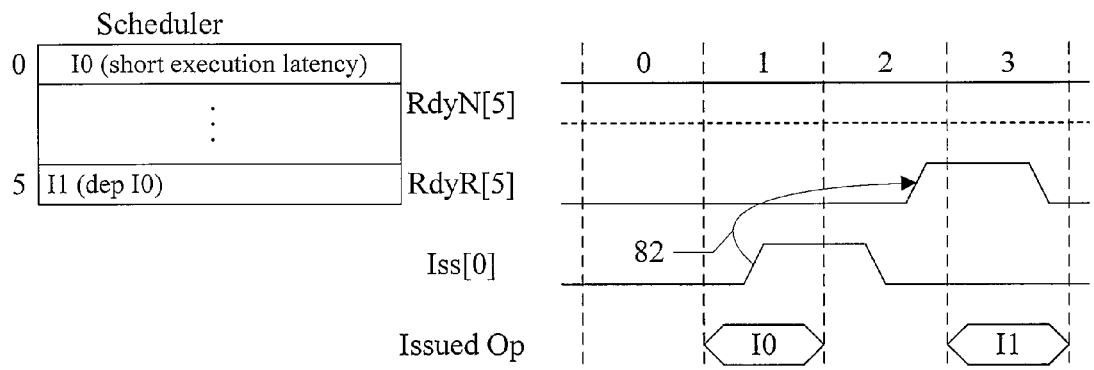
FIG. 5 is a timing diagram illustrating a second example of scheduling a dependent instruction operation.

FIG. 5 is a timing diagram of an example of an op I0 and a dependent op I1, where the op I0 is a short execution latency op. Like FIG. 4, the op I0 is in scheduler entry 0. However, the dependent op I1 is more than N ops away (N is 4 in this example) and thus the dependency of the op I1 on the op I0 is represented in the remaining dependency vector of the op I1 (not shown in FIG. 5). The RdyN[5] and RdyR[5] signals corresponding to scheduler entry 5 (op I1) are shown in the timing diagram of FIG. 5, and the Iss[0] signal is also shown.

In clock cycle 0, the RdyN[5] signal is asserted because there are no dependencies of the op I1 in the near dependency vector (or the dependencies have been satisfied). The op I0 has not yet been scheduled, and thus the RdyR[5] signal is deasserted.

In clock cycle 1, the scheduler 20 schedules the op I0, and thus asserts the Iss[0] signal. The op I0 is also issued from the scheduler 20. Responsive to the Iss[0] signal, the RdyR[5] signal asserts in clock cycle 2 (relationship indicated by arrow 82). The longer scheduling latency of the remaining dependency array 44 accounts for the additional clock cycle of latency. The scheduler 20 detects that the op I1 is eligible to be issued in clock cycle 2, and issues the op I1 in clock cycle 3. Thus, the op I0 and its dependent op I1 do not issue in back-to-back clock cycles. A similar example would apply if the op I0 were a longer execution latency op, except that the RdyR[5] signal may assert later to account for the longer execution latency.

Numerous variations and modifications will become apparent to those skilled in the art once the above disclosure is fully appreciated. It is intended that the following claims be interpreted to embrace all such variations and modifications.

What is claimed is:

1. A scheduler comprising:
a first dependency array configured to store a first plurality of dependency indications corresponding to a plurality of instruction operations concurrently storable in the scheduler, wherein a first dependency indication of the first plurality of dependency indications identifies dependencies for a first instruction operation of the plurality of instruction operations on prior instruction operations, the prior instruction operations within N instruction operations of the first instruction operation in program order, where N is an integer greater than or equal to one and less than a number of the plurality of instruction operations, and the prior instruction operations having an execution latency less than or equal to a specified latency;
a second dependency array configured to store a second plurality of dependency indications corresponding to the plurality of instruction operations, wherein a second dependency indication of the second plurality of dependency indications identifies dependencies for the first instruction operation that are not identified in the first dependency indication; and
a control unit coupled to the first dependency array and the second dependency array, wherein the control unit is configured to schedule the first instruction operation for execution responsive to detecting that the dependencies of the first instruction operation indicated by the first dependency indication and the second dependency indication have been satisfied, wherein a dependency on a second instruction operation is indicated in the second dependency indication, wherein the second instruction operation: (i) is prior to the first instruction operation, (ii) is within N instruction operations of the first instruction operation, (iii) has an execution latency greater than the specified latency, and the first instruction operation has a dependency on the second operation.

2. The scheduler as recited in claim 1 wherein a third instruction operation that is not within N instruction operations of the first instruction operation and on which the first instruction operation has a dependency is represented in the second dependency indication.

3. The scheduler as recited in claim 1 wherein the specified execution latency is one clock cycle.

4. The scheduler as recited in claim 1 wherein the control unit is configured to schedule a given instruction operation for execution and to transmit an indication of the given instruction operation to the first dependency array and the second dependency array, and wherein the first dependency array is configured to update in response to the indication of the given instruction operation more rapidly than the second dependency array is configured to update.

5. The scheduler as recited in claim 4 wherein the first dependency array is configured to update within one clock cycle and the second dependency array is configured to update in two or more clock cycles.

6. A scheduler comprising:
a first dependency array configured to store a first plurality of dependency indications corresponding to a plurality of instruction operations storable in the scheduler;
a second dependency array configured to store a second plurality of dependency indications corresponding to the plurality of instruction operations; and
a control unit coupled to the first dependency array and the second dependency array, wherein the control unit is configured to identify one or more instruction operations being scheduled for execution, wherein the first dependency array and the second dependency array are configured to evaluate which instruction operations have satisfied dependencies in the respective first plurality of dependency indications and the second plurality of dependency indications and to indicate the instruction operations as eligible for scheduling to the control unit, wherein the first dependency array is configured to evaluate in less time than the second dependency array, and wherein the first plurality of dependency indications indicate, for respective ones of the plurality of instruction operations, prior instruction operations within N instruction operations of the respective ones of the plurality of instruction operations on which the respective ones of the plurality of instruction operations depend, wherein N is an integer greater than or equal to one and less than the number of instruction operations, and wherein the first plurality of dependency indications indicate only the prior instruction operations having an execution latency less than or equal to a specified execution latency, and wherein the second plurality of dependency indications indicate the dependencies on instruction operations that are not indicated in the first plurality of dependency indications, including instruction operations that are within N instruction operations of the respective ones of the plurality of instruction operations but have execution latencies greater than the specified execution latency.

7. The scheduler as recited in claim 6 wherein the first dependency array is configured to evaluate in fewer clock cycles than the second dependency array is configured to evaluate.

8. The scheduler as recited in claim 6 wherein the second plurality of dependency indications indicate, for each respective instruction operation of the plurality of instruction operations, prior instruction operations which are not within N instruction operations of the respective instruction operation and on which the respective instruction operation has a dependency.

9. A mapper comprising:
a rename map configured to store, for each logical register in a processor, an identifier of a most recent update to the logical register and an execution latency indication indicating an execution latency of an instruction operation that performs the most recent update, wherein the rename map is coupled to receive one or more source operand identifiers of a first instruction operation and to output corresponding identifiers and execution latency indications; and
a dependency generation unit configured to generate a first dependency indication and a second dependency indication for the first instruction operation responsive to the identifier and the execution latency corresponding to each source operand identifier, wherein a size of the first dependency indication and the second dependency indication are different.

10. The mapper as recited in claim 9 wherein the first dependency indication indicates dependencies for up to N instruction operations and the second dependency indication indicates dependencies for up to M instruction operations, wherein M and N are integers, N is greater than or equal to one and less than M, and M is a number of instruction operations that are concurrently storable in a scheduler to which the mapper transmits the first instruction operation, the first dependency indication, and the second dependency indication.

11. The mapper as recited in claim 10 wherein the first dependency indication indicates dependencies of the first instruction operation on prior instruction operations that are within N instruction operations of the first instruction operation in program order.

12. The mapper as recited in claim 11 wherein the first dependency indication indicates dependencies for the prior instruction operations that are within N instruction operations only if the prior instruction operations have an execution latency less than or equal to a specified execution latency.

13. A processor comprising:
a mapper coupled to receive a decoded instruction operation and configured to generate a first dependency indication and a second dependency indication for the decoded instruction operation responsive to prior instruction operations in the processor on which the decoded instruction operation depends, wherein the first dependency indication indicates dependencies on prior instruction operations that are within N instruction operations of the decoded instruction operation in program order and which have execution latencies that are less than or equal to a specified latency, and wherein the second dependency indication indicates dependencies on up to M instruction operations, wherein N is an integer greater than or equal to one and less than M, and M is a number of instruction operations concurrently storable in a scheduler, and wherein the second dependency indication indicates dependencies on instruction operations that are within N instruction operations of the decoded instruction operation and which have execution latencies that are greater than the specified latency; and
the scheduler coupled to the mapper, wherein the scheduler is configured to schedule the decoded instruction operation for execution responsive to evaluating the first dependency indication and the second dependency indication and determining that the dependencies of the decoded instruction operation have been satisfied.

14. The processor as recited in claim 13 wherein the scheduler is configured to evaluate the first dependency indication in less time than the second dependency indication is evaluated.

15. The processor as recited in claim 14 wherein the scheduler is configured to evaluate the first dependency indication in fewer clock cycles than the second dependency indication.

16. The processor as recited in claim 13 wherein the mapper comprises:
a rename map configured to store, for each logical register in a processor, an identifier of a most recent update to the logical register and an execution latency indication indicating an execution latency of an instruction operation that performs the most recent update, wherein the rename map is coupled to receive one or more source operand identifiers of the decoded instruction operation and to output corresponding identifiers and execution latency indications; and
a dependency generation unit configured to generate the first dependency indication and the second dependency indication for the decoded instruction operation responsive to the identifier and the execution latency corresponding to each source operand identifier.

17. A method comprising:
receiving a first instruction operation;
generating a first dependency indication responsive to prior instruction operations in a processor on which the first instruction operation depends, wherein the first dependency indication indicates dependencies on prior instruction operations that are within N instruction operations of the first instruction operation in program order and the prior instruction operations have execution latencies that are less than or equal to a specified execution latency;

generating a second dependency indication for the first instruction operation, wherein the second dependency indication indicates dependencies on up to M instruction operations, wherein N is an integer greater than or equal to one and less than M, and M is a number of instruction operations concurrently storable in a scheduler, wherein the second dependency indication indicates dependencies on prior instruction operations that are within N instruction operations of the first instruction operation and that have execution latencies that are greater than the specified execution latency;

writing the first instruction operation and the first and second dependency indications to the scheduler;

evaluating the first and second dependency indications to determine that dependencies of the first instruction operation have been satisfied; and scheduling the first instruction operation for execution responsive to determining that dependencies of the first instruction operation have been satisfied.

* * * * *